(12) United States Patent
Abou Rjeily

(10) Patent No.: US 8,279,973 B2
(45) Date of Patent: Oct. 2, 2012

(54) SPACE-TIME CODING METHOD USING A PARTITIONED POSITION MODULATION ALPHABET

(75) Inventor: Chadi Abou Rjeily, Byblos (LB)

(73) Assignee: Commissariat a l'Energie Atomique, Paris (FR)

( * ) Notice: Subject to any disclaimer, the term of this patent is extended or adjusted under 35 U.S.C. 154(b) by 1014 days.

(21) Appl. No.: 12/256,874

(22) Filed: Oct. 23, 2008

(65) Prior Publication Data

US 2009/0110050 A1   Apr. 30, 2009

(30) Foreign Application Priority Data

Oct. 25, 2007   (FR) ...................................... 07 58561

(51) Int. Cl.
 *H04L 27/00* (2006.01)
(52) U.S. Cl. ........ 375/299; 375/130; 375/260; 375/295; 375/302; 375/316
(58) Field of Classification Search .................. 375/130, 375/131, 138, 239, 256, 259, 260, 267, 295, 375/299, 316, 342–346, 350, 302
See application file for complete search history.

(56) References Cited

U.S. PATENT DOCUMENTS

| | | | | |
|---|---|---|---|---|
| 7,496,128 B2 * | 2/2009 | Giannakis et al. | ............ | 375/138 |
| 7,864,831 B2 * | 1/2011 | Abou Rjeily | ................ | 375/130 |
| 7,933,307 B2 * | 4/2011 | Rjeily et al. | .................. | 375/130 |
| 7,974,355 B2 * | 7/2011 | Palanki et al. | ................ | 375/260 |
| 8,064,554 B2 * | 11/2011 | Suzuki et al. | ................. | 375/348 |
| 2005/0135491 A1 * | 6/2005 | Santhoff et al. | ............... | 375/259 |
| 2007/0237209 A1 * | 10/2007 | Rjeily | ........................... | 375/130 |
| 2010/0008404 A1 * | 1/2010 | Abou Rjeily | ................. | 375/141 |

FOREIGN PATENT DOCUMENTS

| | | |
|---|---|---|
| FR | 2 899 042 A1 | 9/2007 |
| FR | 2 899 745 A1 | 10/2007 |
| WO | 2007/107507 A1 | 9/2007 |

OTHER PUBLICATIONS

Abou-Rjeily et al., "A Space-Time Coded MIMO TH-UWB Transceiver with Binary Pulse Position Modulation", IEEE Communications Letters, vol. 11, No. 6, Jun. 2007.
Abou-Rjeily et al., "A Rate-1 2×2 Space-Time Code without any Constellation Extension for TH-UWB Communication Systems with PPM ", Vehicular Technology Conference, 2007, pp. 1683-1687.
Alamouti, "A Simple Transmit Diversity Technique for Wireless Communications", IEEE Journal on Select Areas in Communications, vol. 16, No. 8, Oct. 1998.
French Search Report for counterpart application No. FR0758561; Aug. 13, 2008.
European Search Report for counterpart application No. EP08167005; Nov. 10, 2008.

* cited by examiner

*Primary Examiner* — Hirdepal Singh
(74) *Attorney, Agent, or Firm* — Pearne & Gordon LLP

(57) ABSTRACT

The invention relates to a space-time coding method for a MIMO-UWB system with P antennas using information symbols belonging to an M-PPM, where M is a multiple of P. The modulation alphabet is partitioned into P sub-alphabets corresponding to successive ranges of modulation positions. An extension of the initial alphabet is obtained by forcing the information symbols to belong to some sub-alphabets, thereby increasing the binary rate of said system.

14 Claims, 4 Drawing Sheets

SPACE-TIME CODING METHOD USING A PARTITIONED POSITION MODULATION ALPHABET

TECHNICAL DOMAIN

This invention relates to the domain of Ultra Wide Band (UWB) telecommunications and also multi-antenna Space Time Coding (STC) systems.

STATE OF PRIOR ART

Multi-antenna type systems are well known in the state of the art. These systems use a plurality of emission and/or reception antennas and are called MIMO (Multiple Input Multiple Output), MISO (Multiple Input Single Output) or SIMO (Single Input Multiple Output) depending on the adopted configuration type. In the remainder of this description, we will use the term MIMO to cover the MIMO and MISO variants mentioned above. Use of spatial diversity on emission and/or on reception enables these systems to offer significantly better channel capacities than classical single antenna systems (or SISO for Single Input Single Output). This spatial diversity is usually completed by temporal diversity using Space-Time Coding (STC). In this type of coding system, there is one information symbol to be transmitted coded on several antennas and several transmission instants.

Two large categories of MIMO space time coding category systems are known: firstly there are Space Time Trellis Coding (STTC) systems, and secondly Space Time Block Coding (STBC) systems. In a block coding system, a block of information symbols to be transmitted is coded into a matrix of transmission symbols, in which one dimension of the matrix corresponds to the number of antennas and the other corresponds to consecutive transmission instants.

FIG. 1 diagrammatically shows a MIMO transmission system 100 using STBC coding. An information symbol block $S=(\sigma_1, \ldots, \sigma_b)$, for example a binary word containing b bits or more generally b M-ary symbols, is coded as a space-time matrix:

$$C = \begin{pmatrix} c_{1,1} & c_{1,2} & \cdots & c_{1,P} \\ c_{2,1} & c_{2,2} & \cdots & c_{2,P} \\ \vdots & \vdots & \ddots & \vdots \\ c_{T,1} & c_{T,2} & \cdots & c_{T,P} \end{pmatrix} \quad (1)$$

where the coefficients $c_{t,p}$, $t=1, \ldots, T$; $p=1, \ldots, P$ of the code are usually complex coefficients dependent on information symbols, P is the number of antennas used in emission, T is an integer indicating the time extension of the code, in other words the number of channel uses or PCUs (Per Channel Use).

The function $f$, that makes the space-time C code word correspond to every vector S of information symbols, is called the coding function. If the function $f$ is linear, it is said that the space-time code is linear. If the coefficients $c_{t,p}$ are real, the space-time code is said to be real.

In FIG. 1, a space-time encoder is denoted by 110. At each instant at which the channel t is used, the encoder supplies the t-th row vector of the matrix C to the multiplexer 120. The multiplexer transmits the row vector coefficients to the modulators $130_1, \ldots, 130_P$, and the modulated signals are transmitted by the antennas $140_1, \ldots, 140_P$.

The space-time code is characterized by its rate, in other words by the number of information symbols that it transmits per instant of channel use (PCU). The code is said to be full rate if it is P times higher than the rate for a single antenna use (SISO).

The space-time code is also characterised by its diversity, that can be defined as the rank of matrix C. Maximum diversity would occur if the matrix $C_1-C_2$ is full rank for two arbitrary code words $C_1$ and $C_2$ corresponding to two vectors $S_1$ and $S_2$.

Finally, the space-time code is characterized by its coding gain that translates the minimum distance between different code words. It can be defined as follows:

$$\min_{C_1 \neq C_2} \det((C_1 - C_2)^H (C_1 - C_2)) \quad (2)$$

or equivalently for a linear code:

$$\min_{C \neq 0} \det(C^H C) \quad (3)$$

where det(C) refers to the determinant of C and $C^H$ is the transposed conjugate matrix of C. The coding gain for transmission energy per information symbol is bounded.

A space-time code will be particularly resistant to fading if its coding gain is high.

A first example of space-time coding for a MIMO system with two transmission antennas was proposed in the article by S. M. Alamouti entitled "A transmit diversity technique for wireless communications", published in the IEEE Journal on selected areas in communications, vol. 16, pp. 1451-1458, October 1998. The Alamouti code is defined by the 2×2 space-time matrix:

$$C = \begin{pmatrix} \sigma_1 & \sigma_2 \\ -\sigma_2^* & \sigma_1^* \end{pmatrix} \quad (4)$$

where $\sigma_1$ and $\sigma_2$ are two information symbols to be transmitted and $\sigma_1^*$ and $\sigma_2^*$ are their conjugates. As can be seen in the expression (4), this code transmits two information symbols for two channel uses and therefore its rate is one symbol/PCU.

Although initially presented in the above-mentioned article for symbols belonging to a QAM modulation, the Alamouti code is also applicable to information symbols belonging to a PAM or PSK modulation. On the other hand, it cannot easily be extended to a Pulse Position Modulation PPM. The symbol in a PPM modulation alphabet with M positions can be represented by a vector of M components, all null except one that is equal to 1, corresponding to the modulation position at which a pulse is emitted. The use of PPM symbols in the expression (4) then leads to a space-time matrix with size 2M×2. The term $-\sigma_2^*$ appearing in the matrix is not a PPM symbol and requires the transmission of a pulse with a sign change. In other words, it is equivalent to using signed PPM symbols belonging to an extension of the PPM modulation alphabet.

A second example of a space-time code was proposed in the article by C. Abou-Rjeily et al. entitled "A space-time coded MIMO TH-UWB transceiver with binary pulse position modulation" published in IEEE Communications Letters, Vol. 11, No. 6, June 2007, pages 522-524. This code is applicable to multi-antenna systems with a number of transmission antennas equal to a power of 2, in other words $P=2^p$ and to information symbols belonging to a Binary Pulse Position Modulation (BPPM) alphabet. More precisely, the proposed space-time code matrix is written in the following form:

$$C = \begin{pmatrix} \sigma_1 & \sigma_2 & \cdots & \sigma_P \\ \Omega\sigma_P & \sigma_1 & \ddots & \vdots \\ \vdots & \ddots & \ddots & \sigma_2 \\ \Omega\sigma_2 & \cdots & \Omega\sigma_P & \sigma_1 \end{pmatrix} \quad (5)$$

in which the BPPM information symbols $\sigma_1, \sigma_2, \ldots, \sigma_P$ are represented in the form of vectors $(1\ 0)^T$ or $(0\ 1)^T$, the first vector corresponding to the first PPM position and the second vector corresponding to the second PPM position, and where $\Omega$ is the 2×2 size permutation matrix. This space-time code has the advantage that it does not use complex or signed symbols and it has maximum diversity. On the other hand, this code can only transmit one BPPM symbol per channel use (therefore 1 bit/CPU), which is the same as that of a conventional single-antenna system.

A third example of a space-time code was given in the article by C. Abou-Rjeily et al. entitled "A rate-1 2×2 space-time code without any constellation extension for TH-UWB communications system with PPM" published in Proceedings of the 2007 VTC Conference, pages 1683-1687, April 2007. This code is applicable to systems with P=2 transmission antennas and to information symbols belonging to an M-PPM modulation alphabet. More precisely, the matrix of the proposed space-time code is written in the form:

$$C = \begin{pmatrix} \sigma_1 & \sigma_2 \\ \Omega\sigma_2 & \sigma_1 \end{pmatrix} \quad (6)$$

where the information symbols M-PPM $\sigma_1, \sigma_2, \ldots, \sigma_P$ may be represented in the form of vectors with dimension M, in which M−1 components are null and the remaining component equal to 1 indicates the modulation position of the PPM symbol, and where $\Omega$ is the permutation matrix with size M×M.

As in the second example, this space-time code has the advantage that it does not use complex or signed symbols. It also has maximum diversity for all values of $M \geq 2$. On the other hand, once again, the code can only be used to transmit one M-PPM symbol per channel use (therefore a binary rate of $\log_2(M)$/PCU which is the same as for a conventional single-antenna system.

MIMO symbols with space-time coding using UWB (Ultra Wide Band) transmission signals have been proposed in the literature. A UWB signal is a signal conforming with the spectral mask stipulated in the Feb. 14, 2002 FCC regulation, revised in March 2005, in other words essentially a signal in the 3.1 to 10.6 GHz spectral band with a band width equal to at least 500 MHz at −10 dB.

UWB signals are divided into two categories: OFDM multi-band signals (MB-OFDM) and UWB pulse type signals. The remainder of this application will only consider pulse type signals.

A pulse UWB signal is composed of very short pulses, typically of the order of a few hundred picoseconds, distributed within a frame. A distinct Time Hopping (TH) code is assigned to each user, in order to reduce Multiple Access Interference (MAI). The TH-UWB signal output from or sent to a user k can then be written in the following form:

$$s_k(t) = \sum_{n=0}^{N_s-1} w(t - nT_s - c_k(n)T_c) \quad (7)$$

where w is the shape of the elementary pulse, $T_c$ is a chip duration, $T_s$ is the duration of an elementary interval in which $N_s = N_c T_c$ where $N_c$ is the number of chips in an interval, the total frame duration being $T_f = N_s T_s$ where $N_s$ is the number of intervals in the frame. The duration of the elementary pulse is chosen to be less than the chip duration, namely $T_w \leq T_c$. The sequence $c_k(n)$ for $n=0, \ldots, N_s-1$ defines the time hopping code of the user k. Time hopping sequences are chosen to minimize the number of collisions between pulses belonging to time hopping sequences of different users.

FIG. 2 shows a TH-UWB signal associated with a user k. It will be noticed that the sequence $c_k(n)$, $n=0, \ldots, N_s-1$, for the user in question is $c_k(n)=7,1,4,7$ in this case.

In a MIMO system with space-time coding using UWB signals, also called MIMO-UWB, each antenna transmits a modulated UWB signal as a function of an information symbol or a block of such symbols. For example, for a given antenna p, if the information symbols are of the QAM or BPSK type, the signal $s^p(t)$ transmitted by this antenna can be expressed keeping the same notations as above but by ignoring the index for the user:

$$s^p(t) = \sum_{n=0}^{N_s-1} \sigma_p w(t - nT_s - c(n)T_c) \quad (8)$$

where $\sigma_p$ is the transmitted QAM or BPSK information symbol.

Considering the very large band width of UWB signals, it is very difficult to retrieve phase information at the receiver and therefore to detect an information symbol $\sigma_p$. Furthermore, some UWB systems are unsuitable or hardly suitable for the transmission of signed pulses. For example, optical UWB systems only transmit TH-UWB light intensity signals, which necessarily do not have any sign information.

Space-time codes using PPM symbols avoid the use of complex or signed pulses. If $\sigma_p$ is an M-PPM symbol transmitted by antenna p, the signal transmitted by this antenna can be expressed in the following form:

$$s^p(t) = \sum_{n=0}^{N_s-1} w(t - nT_s - c(n)T_c - \mu_p \varepsilon) \quad (9)$$

where $\varepsilon$ is a modulation delay (dither) significantly less than the chip duration and $\mu_p \in \{0, \ldots, M-1\}$ is the M-ary PPM position of the symbol, the first position in this case being considered as introducing a zero delay.

For example, the second and third examples of a space-time code mentioned above are well adapted to UWB MIMO systems. However, as mentioned above, these codes cannot give a higher rate than a conventional mono-antenna system.

The purpose of this invention is to propose a space-time coding method for a UWB-MIMO system that, although it does not use complex or signed information symbols, is capable of reaching higher rates than a single antenna system.

PRESENTATION OF THE INVENTION

According to a first embodiment, this invention is defined by a space-time coding method for a UWB transmission system comprising two radiative elements, said method coding a block of information symbols S=($\sigma_1,\sigma_2,\sigma_3,\sigma_4$) belonging to a PPM modulation alphabet with an even number M of modulation positions, said alphabet being partitioned into first and second sub-alphabets corresponding to successive ranges of modulation positions, the symbols $\sigma_1,\sigma_3$ belonging to the first sub-alphabet and the symbols $\sigma_2,\sigma_4$ belonging to the second sub-alphabet, the method coding said symbol block into a sequence of vectors, each vector being associated with a given use of the transmission channel and a given radiative element, the components of a vector being intended to modulate the position of a pulse UWB signal, each component corresponding to a PPM modulation position, said vectors being obtained from elements of the matrix:

$$C = \begin{pmatrix} \sigma_1 + \sigma_2 & \sigma_3 + \sigma_4 \\ \Delta(\sigma_3 + \Omega\sigma_4) & \sigma_1 + \Omega\sigma_2 \end{pmatrix}$$

one line of the matrix corresponding to one use of the transmission channel and one column of the matrix corresponding to one radiative element, the matrix C being defined within one permutation of its rows and/or its columns, $\Delta$ being a permutation of the PPM positions of said alphabet and $\Omega$ being a permutation of the PPM modulation positions of said second sub-alphabet.

The matrix $\Omega$ is advantageously a circular permutation, for example a circular shift of said PPM modulation positions of said second alphabet.

According to a second embodiment, the invention is defined by a space-time coding method for a UWB transmission system comprising three radiative elements, said method coding a block of information symbols S=($\sigma_1,\sigma_2,\sigma_3,\sigma_4,\sigma_5,\sigma_6,\sigma_7,\sigma_8,\sigma_9$) belonging to a PPM modulation alphabet with a number M of modulation positions that is a multiple of 3, said alphabet being partitioned into first, second and third sub-alphabets corresponding to successive ranges of modulation positions, the $\sigma_1,\sigma_4,\sigma_7$ symbols belonging to the first sub-alphabet, the $\sigma_2,\sigma_5,\sigma_8$ symbols belonging to the second sub-alphabet and the $\sigma_3,\sigma_6,\sigma_9$ symbols belonging to the third sub-alphabet, the method coding said block of symbols into a sequence of vectors, each vector being associated with a given use of the transmission channel and a given radiative element, components of a vector being designed to modulate the position of a pulse UWB signal, each component corresponding to a PPM modulation position, said vectors being obtained from elements of the matrix:

$$C = \begin{pmatrix} \sigma_1+\sigma_2+\sigma_3 & \sigma_4+\sigma_5+\sigma_6 & \sigma_7+\sigma_8+\sigma_9 \\ \Delta(\sigma_7+\Omega^{(1)}\sigma_8+\sigma_9) & \sigma_1+\Omega^{(1)}\sigma_2+\sigma_3 & \sigma_4+\Omega^{(1)}\sigma_5+\sigma_6 \\ \Delta(\sigma_4+\sigma_5+\Omega^{(2)}\sigma_6) & \Delta(\sigma_7+\sigma_8+\Omega^{(2)}\sigma_9) & \sigma_1+\sigma_2+\Omega^{(2)}\sigma_3 \end{pmatrix}$$

one row of the matrix corresponding to one use of the transmission channel and one column of the matrix corresponding to one radiative element, the matrix C being defined within one permutation of its rows and/or its columns, $\Delta$ being a permutation of the PPM positions of said alphabet, $\Omega^{(1)}$ being a permutation of the PPM modulation positions of said second sub-alphabet and $\Omega^{(2)}$ being a permutation of the PPM modulation positions of said third sub-alphabet.

The $\Omega^{(1)}$ and/or $\Omega^{(2)}$ matrices is/are one or more circular permutations, for example one or more circular shifts of the PPM modulation positions of the second and third sub-alphabets respectively.

According to a third embodiment, the invention is defined by a space-time coding method for a UWB transmission system comprising a plurality P of radiative elements, said method coding a block of information symbols S=($\sigma_1,\sigma_2,\ldots,\sigma_{P^2}$) belonging to a PPM modulation alphabet with a number M of modulation positions that is a multiple of P, said alphabet being partitioned into P sub-alphabets corresponding to successive ranges of modulation positions, the $\sigma_{qP+1}$, q=0,...,P−1 symbols belonging to the first sub-alphabet, the $\sigma_{qP+2}$, q=0,...,P−1 symbols belonging to the second sub-alphabet and so on, the $\sigma_{qP+P}$, q=0,...,P−1 symbols belonging to the Pth sub-alphabet, the method coding said block of symbols into a sequence of vectors, each vector being associated with a given use of the transmission channel and a given radiative element, the components of a vector being intended to modulate the position of a pulse UWB signal, each component corresponding to a PPM modulation position, said vectors being obtained from elements of the matrix given in the appendix, one row of the matrix corresponding to one use of the transmission channel and one column of the matrix corresponding to one radiative element, the matrix C being defined within one permutation of its rows and/or its columns, $\Delta$ being a permutation of the PPM positions of said alphabet, the matrices $\Omega^{(p)}$, p=1,...,P−1 being a permutation of the PPM modulation positions of the (p+1)th sub-alphabet.

At least one matrix $\Omega^{(p)}$, p=1,...,P−1 may be a circular permutation, for example a circular shift of the PPM modulation positions of the (p+1)th sub-alphabet.

In the same way, the matrix $\Delta$ may be a circular permutation, for example a circular shift of said alphabet.

According to a first variant, the radiative elements are UWB antennas.

According to a second variant, the radiative elements are laser diodes or light emitting diodes.

Advantageously, said pulse signal may be a TH-UWB signal.

BRIEF DESCRIPTION OF THE DRAWINGS

Other characteristics and advantages of the invention will become clear after reading a preferred embodiment of the invention with reference to the appended figures among which.

DETAILED PRESENTATION OF PARTICULAR EMBODIMENTS

Figure 1:
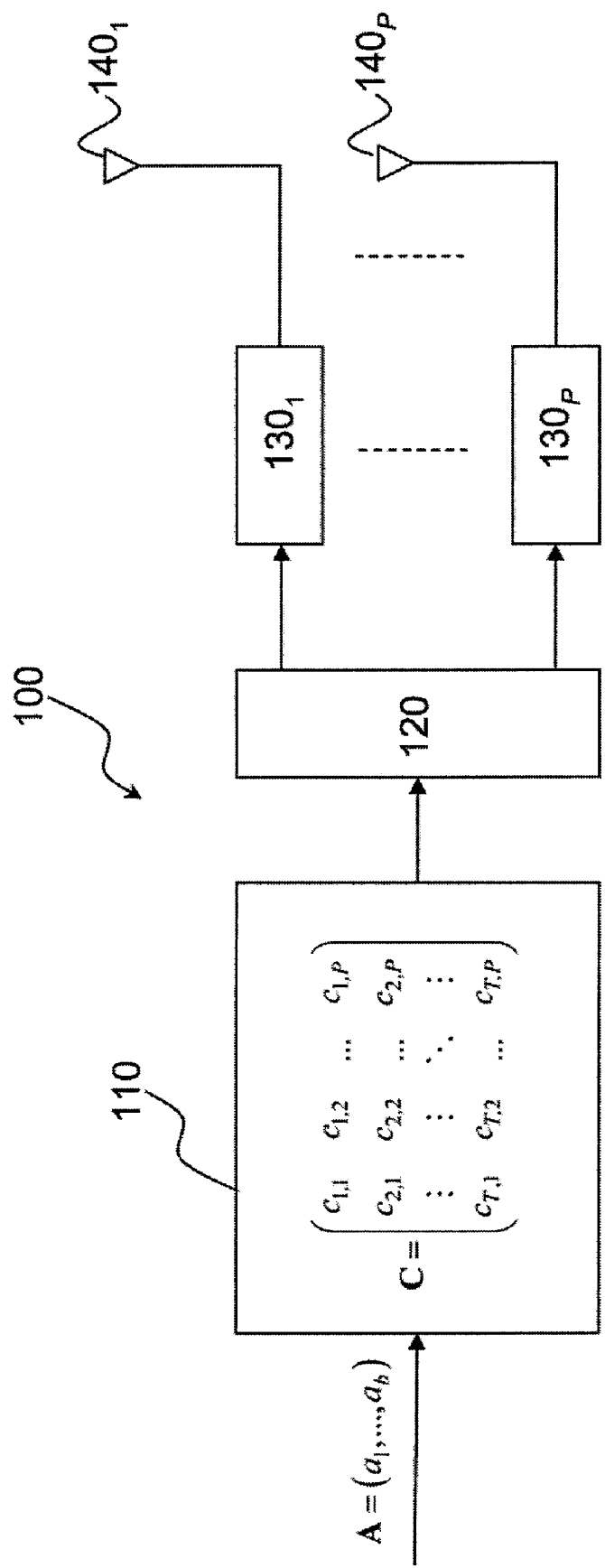
FIG. 1 diagrammatically shows a known MIMO transmission system with STBC coding according to the state of the art.
Figure 2:
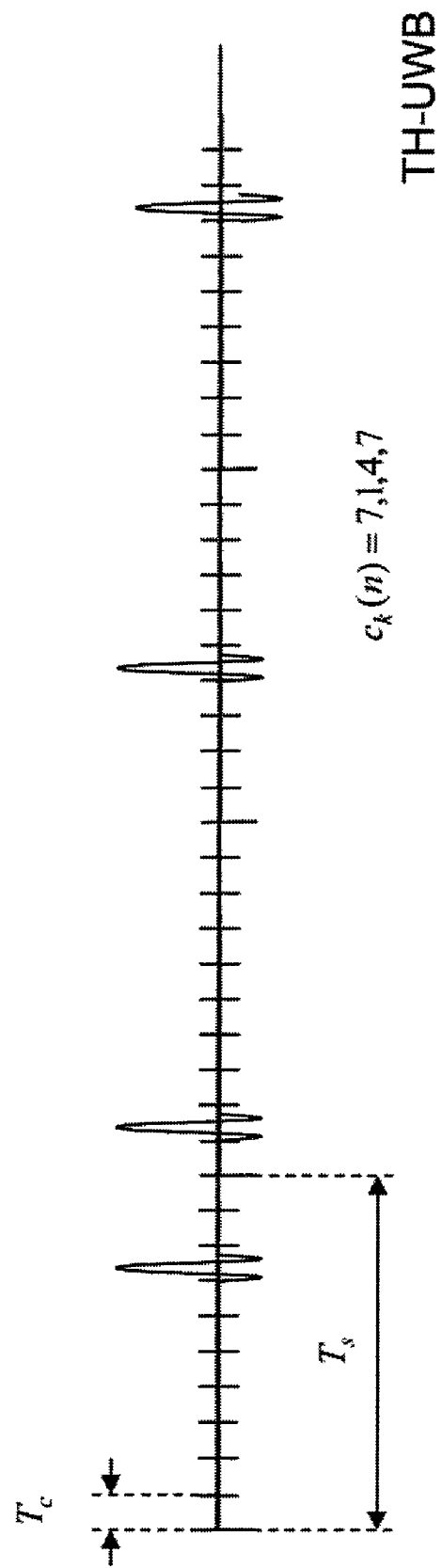
FIG. 2 shows the shape of a TH-UWB signal.

The basic idea of this invention is to partition a PPM modulation alphabet into distinct ranges and to create an extension of the PPM modulation alphabet starting from the alphabet that was thus partitioned, the space-time code being generated from a block of symbols belonging to the alphabet thus extended. As we will see later, the extension of the alphabet can increase the rate of the code.

According to a first embodiment, we will firstly assume a UWB transmission system with P=2 transmission antennas or more generally with P=2 radiative elements.

We will also assume that we have an M-PPM modulation alphabet denoted A, with an even number M of modulation positions. These positions may be arranged in a given time order, for example $\{1, \ldots, M\}$, where 1 is the minimum time shift and M is the maximum time shift. In the remainder of this description, a modulation position will indifferently be represented by an index $m \in \{1, \ldots, M\}$ or by a vector $\sigma$ with size M and components that are all zero except for the mth component equal to 1, defining the position concerned.

The alphabet A is partitioned in two separate consecutive ranges, or sub-alphabets, namely $$A_1 = \left\{1, \ldots, \frac{M}{2}\right\}$$

and $$A_2 = \left\{\frac{M}{2} + 1, M\right\}.$$

We will consider blocks of information symbols $S=(\sigma_1, \sigma_2, \sigma_3, \sigma_4)$ in which $\sigma_1, \sigma_2, \sigma_3, \sigma_4$ are symbols of A such that $\sigma_1, \sigma_3 \in A_1$ and $\sigma_2, \sigma_4 \in A_2$. The alphabet $\tilde{A}$ composed of quadruples $\sigma_1, \sigma_2, \sigma_3, \sigma_4$ satisfies the above condition, namely:

$$\tilde{A} = \{(\sigma_1, \sigma_2, \sigma_3, \sigma_4) | \sigma_1, \sigma_3 \in A_1 \; et \; \sigma_2, \sigma_4 \in A_2\} \quad (10)$$

is an extension of the alphabet A, with cardinal $$\mathrm{Card}(\tilde{A}) = \left(\frac{M}{2}\right)^4,$$

since $$\mathrm{Card}(A_1) = \mathrm{Card}(A_2) = \frac{M}{2}.$$

For example for an 8-PPM alphabet, the alphabet $\tilde{A}$ will be composed of quadruples $\sigma_1, \sigma_2, \sigma_3, \sigma_4$, such as:

$$\sigma_1, \sigma_3 \in \left\{ \begin{pmatrix}1\\0\\0\\0\\0\\0\\0\\0\end{pmatrix}, \begin{pmatrix}0\\1\\0\\0\\0\\0\\0\\0\end{pmatrix}, \begin{pmatrix}0\\0\\1\\0\\0\\0\\0\\0\end{pmatrix}, \begin{pmatrix}0\\0\\0\\1\\0\\0\\0\\0\end{pmatrix} \right\}$$

and $$\sigma_2, \sigma_4 \in \left\{ \begin{pmatrix}0\\0\\0\\0\\1\\0\\0\\0\end{pmatrix}, \begin{pmatrix}0\\0\\0\\0\\0\\1\\0\\0\end{pmatrix}, \begin{pmatrix}0\\0\\0\\0\\0\\0\\1\\0\end{pmatrix}, \begin{pmatrix}0\\0\\0\\0\\0\\0\\0\\1\end{pmatrix} \right\}$$

In the general case of an M-PPM alphabet in which M is even, the space-time code used by the MIMO-UWB system with two antennas is defined by the following matrix with size 2M×2:

$$C = \begin{pmatrix} \sigma_1 + \sigma_2 & \sigma_3 + \sigma_4 \\ \Delta(\sigma_3 + \Omega\sigma_4) & \sigma_1 + \Omega\sigma_2 \end{pmatrix} \quad (11)$$

where $\sigma_1, \sigma_2, \sigma_3, \sigma_4$ are information symbols to be transmitted, represented in the form of column vectors with size M;

$\Omega$ is a matrix with size M×M defined by:

$$\Omega = \begin{pmatrix} I_{M'} & 0_{M'} \\ 0_{M'} & \Omega' \end{pmatrix} \quad (12)$$

where $$M' = \frac{M}{2},$$

in which $I_{M'}$ and $0_{M'}$ are the unit matrix and the zero matrix with size M'×M' respectively, and $\Omega'$ is a permutation matrix with size M'×M'. It will be noted that the matrix $\Omega$ will only permute the modulation positions of the alphabet $A_2$;

$\Delta$ is a permutation matrix with size M×M operating on modulation positions of the alphabet A.

A permutation on a set of modulation positions is any bijection of this set on itself, except for the unit matrix we have unit. The permutation matrix $\Omega'$ may in particular be a circular permutation matrix on the last M' positions, for example a simple circular shift:

$$\Omega' = \begin{pmatrix} 0_{1 \times M'-1} & 1 \\ I_{M'-1 \times M'-1} & 0_{M'-1 \times 1} \end{pmatrix} \quad (13)$$

$$= \begin{pmatrix} 0 & 0 & \ldots & 0 & 1 \\ 1 & 0 & \ldots & 0 & 0 \\ 0 & 1 & 0 & \ddots & \vdots \\ \vdots & \ddots & \ddots & \ddots & 0 \\ 0 & \ldots & 0 & 1 & 0 \end{pmatrix}$$

where $I_{M'-1 \times M'-1}$ is the unit matrix with size M'-1, $0_{1 \times M'-1}$ is the null row vector with size M'-1, $0_{M'-1 \times 1}$ is the null column vector with size M'''1.

Similarly, the matrix $\Delta$ may be a circular permutation on the M modulation positions of the alphabet A, for example a simple circular shift:

$$\Delta = \begin{pmatrix} 0_{1 \times M-1} & 1 \\ I_{M-1 \times M-1} & 0_{M-1 \times 1} \end{pmatrix} \quad (14)$$

$$= \begin{pmatrix} 0 & 0 & \cdots & 0 & 1 \\ 1 & 0 & \cdots & 0 & 0 \\ 0 & 1 & 0 & \ddots & \vdots \\ \vdots & \ddots & \ddots & \ddots & 0 \\ 0 & \cdots & 0 & 1 & 0 \end{pmatrix}$$

where $I_{M-1 \times M-1}$ is the unit matrix with size M-1, $0_{1 \times M-1}$ is the null row vector with size M-1, $0_{M-1 \times 1}$ is the null column vector with size M-1.

It is important to note that the space-time code is defined within one permutation of the rows and columns of C. A permutation on the rows—in this description a row is a row of vectors in the expression (11)—and/or the columns of C is also a space-time code according to the invention, a permutation on the rows being equivalent to one permutation of the channel use instants and a permutation on the columns being equivalent to a permutation of the transmission antennas.

As can be seen from (11), components of the matrix C are simply 0s and 1s and not signed values. Consequently, these components do not introduce any phase inversion nor generally a phase shift. This space-time code is equally suitable for modulation of an ultra-wide band signal.

Furthermore, the matrix C has the same number of "1s" in each of its columns (four "1" values, namely two "1" values per PCU), which results in a beneficial equal distribution of energy on the different antennas.

We can explicitly describe the space-time code matrix in the case in which the $\Omega'$ and $\Delta$ matrices are the matrices given by expressions (13) and (14) respectively:

$$C = \begin{pmatrix} \sigma_{1,1} & \sigma_{3,1} \\ \sigma_{1,2} & \sigma_{3,2} \\ \vdots & \vdots \\ \sigma_{1,M'} & \sigma_{3,M'} \\ \sigma_{2,M'+1} & \sigma_{4,M'+1} \\ \sigma_{2,M'+2} & \sigma_{4,M'+2} \\ \vdots & \vdots \\ \sigma_{2,M} & \sigma_{4,M} \\ \sigma_{4,M-1} & \sigma_{1,1} \\ \sigma_{3,1} & \sigma_{1,2} \\ \vdots & \vdots \\ \sigma_{3,M'} & \sigma_{1,M'} \\ \sigma_{4,M} & \sigma_{2,M} \\ \sigma_{4,1} & \sigma_{2,1} \\ \vdots & \vdots \\ \sigma_{4,M-2} & \sigma_{2,M-1} \end{pmatrix} \quad (15)$$

where $\sigma_i = (\sigma_{i1}, \sigma_{i2}, \ldots, \sigma_{iM})^T$ for $i=1, \ldots, 4$. The expression (15) is obtained taking account of the fact that the last M components of $\sigma_1, \sigma_3$ and the first M components of $\sigma_2, \sigma_4$ are null.

It will be noted that the binary rate of the space-time code defined by expression (11) is:

$$R = \frac{\log_2\left(\left(\frac{M}{2}\right)^4\right)}{2} = 2\log_2\left(\frac{M}{2}\right) \quad (16)$$

For example, for an 8-PPM modulation, the rate will be 4 bits/CPU while the rate of a conventional single-antenna system is 3 bits/CPU. The gain in rate will be particularly marked if the order of the PPM modulation is higher.

Furthermore, it can be shown that the space-time code has maximum diversity. It will be remembered that a code is maximum diversity if $\Delta C=C-C'$ is full rank for any pair of distinct matrices C,C' of the code. If the $\Delta C$ matrix is not full rank, this would mean that its two column vectors:

$$\Delta C = \begin{pmatrix} \delta\sigma_1 + \delta\sigma_2 & \delta\sigma_3 + \delta\sigma_4 \\ \Delta(\delta\sigma_3 + \Omega\delta\sigma_4) & \delta\sigma_1 + \Omega\delta\sigma_2 \end{pmatrix} \quad (17)$$

where $\delta\sigma_i = \sigma_i - \sigma'_i$, would be co-linear. The first line $\Delta C$ clearly shows that this means that $\delta\sigma_1 = \delta\sigma_3$ and $\delta\sigma_2 = \delta\sigma_4$ and the second line clearly shows that $\delta\sigma_1 = \delta\sigma_3 = \delta\sigma_2 = \delta\sigma_4 = 0$, in other words $\Delta C=0$.

Figure 3:
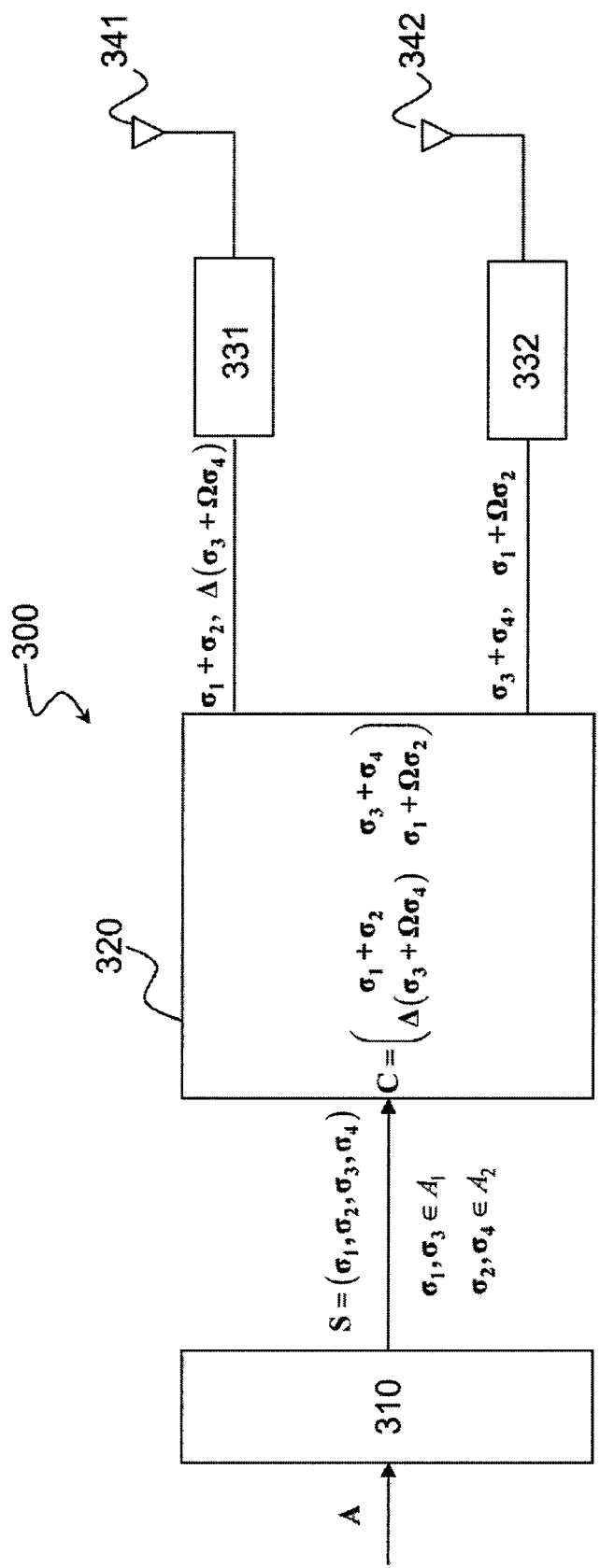
FIG. 3 diagrammatically shows a multi-antenna UWB transmission system according to a first embodiment of the invention.

FIG. 3 shows an example of a UWB transmission system with two radiative elements, according to a first embodiment of the invention. The radiative elements may be UWB antennas, laser diodes or infrared LEDs. The system 300 comprises a space-time encoder 320, two UWB modulators denoted by 331 and 332 and two UWB antennas 341 and 342. The encoder 320 receives blocks of information symbols $S=(\sigma_1, \sigma_2, \sigma_3, \sigma_4)$ belonging to the alphabet $\tilde{A}$ and calculates the elements of the matrix C satisfying the expression (11) or a variant obtained by permutation of its rows and/or columns as mentioned above. In the case of a space-time code defined by (11), the encoder 320 transmits the vectors $\sigma_1+\sigma_2$ and $\sigma_3+\sigma_4$ to modulators 331 and 332 respectively during the first channel use, and vectors $\Delta(\sigma_3+\Omega\sigma_4)$ and $\sigma_1+\Omega\sigma_2$ during the second channel use.

The UWB modulator 331 generates the corresponding modulated pulse UWB signals from the column vectors $\sigma_1+\sigma_2$ and $\Delta(\sigma_3+\Omega\sigma_4)$, and transmits them to the radiative element 341 during the first and second channel uses, respectively. Similarly, the UWB modulator 332 starts from the vectors $\sigma_3+\sigma_4$ and $\sigma_1+\Omega\sigma_2$ and generates the corresponding modulated pulse UWB signals and transmits them to the radiative element 342 during the first and second channel uses respectively.

The system 300 may also comprise a transcoder 310 adapted to receiving information symbols, for example binary symbols $A=(a_1, a_2, \ldots, a_b)$, and coding them in the form of blocks $S \in \tilde{A}$. The transcoder may also comprise source coding means and/or channel coding means before the transcoding operation itself, in a manner known as such.

For example, we can describe the signals transmitted by the antennas 341 and 342 during the two transmission instants when the space-time code is defined by the expression (15). It is also assumed that the modulators 331, 332 do a TH-UWB type modulation.

During the first channel use, the antenna 341 transmits a first frame, namely by using the notations in (9):

$$s^1(t) = \sum_{n=0}^{N_s-1} \sum_{m=1}^{M} (\sigma_{1,m} + \sigma_{2,m}) w(t - nT_s - c(n)T_c - m\varepsilon) \quad (18)$$

-continued $$= \sum_{n=0}^{N_s-1} w(t - nT_s - c(n)T_c - \mu_1\varepsilon) +$$
$$w(t - nT_s - c(n)T_c - \mu_2\varepsilon) \quad (5)$$

where $\mu_1$ and $\mu_2$ are the corresponding modulation positions of the $\sigma_1$ and $\sigma_2$ symbols, where $1 \leq \mu_1 \leq M'$ and $M'+1 \leq \mu_2 \leq M$. The first PPM position in this case corresponds to a time shift of $\varepsilon$ but a zero shift could alternately have been envisaged.

At the same time, the antenna 342 transmits a first frame:

$$s^2(t) = \sum_{n=0}^{N_s-1} \sum_{m=1}^{M} (\sigma_{3,m} + \sigma_{4,m})w(t - nT_s - c(n)T_c - m\varepsilon) \quad (19)$$
$$= \sum_{n=0}^{N_s-1} w(t - nT_s - c(n)T_c - \mu_3\varepsilon) +$$
$$w(t - nT_s - c(n)T_c - \mu_4\varepsilon)$$

During the second use of the channel, the antenna 341 transmits a second frame:

$$s^2(t) = \sum_{n=0}^{N_s-1} \sum_{m=1}^{M} (\sigma_{3,\omega(m)} + \sigma_{4,\delta\cdot\omega(m)})w(t - nT_s - c(n)T_c - m\varepsilon) \quad (20)$$
$$= \sum_{n=0}^{N_s-1} w(t - nT_s - c(n)T_c - \omega(\mu_3)\varepsilon) +$$
$$w(t - nT_s - c(n)T_c - \delta\cdot\omega(\mu_4)\varepsilon)$$

where $\omega(.)$ is the straight circular shift of $\{M'+1, \ldots, M\}$ corresponding to $\Omega$ and $\delta(.)$ is the straight circular shift on $\{1, 2, \ldots, M\}$ corresponding to $\Delta$ and $\circ$ is the composition operation.

And the antenna 342 simultaneously transmits a second frame:

$$s^2(t) = \sum_{n=0}^{N_s-1} \sum_{m=1}^{M} (\sigma_{1,m} + \sigma_{2,\omega(m)})w(t - nT_s - c(n)T_c - m\varepsilon) \quad (21)$$
$$= \sum_{n=0}^{N_s-1} w(t - nT_s - c(n)T_c - \mu_1\varepsilon) +$$
$$w(t - nT_s - c(n)T_c - \omega(\mu_2)\varepsilon)$$

According to a second embodiment, the MIMO system comprises P=3 UWB antennas and the number M of modulation positions is a multiple of 3. The alphabet A is partitioned into three separate consecutive ranges or sub-alphabets, namely $$A_1 = \left\{1, \ldots, \frac{M}{3}\right\},$$
$$A_2 = \left\{\frac{M}{3}+1, \frac{2M}{3}\right\} \text{ and } A_3 = \left\{\frac{2M}{3}+1, M\right\}.$$

We will consider
blocks of information symbols $S=(\sigma_1, \sigma_2, \sigma_3, \sigma_4, \sigma_5, \sigma_6, \sigma_7, \sigma_8, \sigma_9)$ where $\sigma_1, \sigma_2, \sigma_3, \sigma_4, \sigma_5, \sigma_6, \sigma_7, \sigma_8, \sigma_9$ are symbols of A such that $\sigma_1, \sigma_4, \sigma_7 \in A_1$, $\sigma_2, \sigma_5, \sigma_8 \in A_2$ and $\sigma_3, \sigma_6, \sigma_9 \in A_3$. The alphabet $\tilde{A}$ is composed of nonuplets $\sigma_1, \sigma_2, \sigma_3, \sigma_4, \sigma_5, \sigma_6, \sigma_7, \sigma_8, \sigma_9$ satisfying the previous condition, in other words:

$$\tilde{A} = \{(\sigma_1, \sigma_2, \sigma_3, \sigma_4, \sigma_5, \sigma_6, \sigma_7, \sigma_8, \sigma_9) | \sigma_1, \sigma_4, \sigma_7 \in A_1; \sigma_2, \sigma_5, \sigma_8 \in A_2; \sigma_3, \sigma_6, \sigma_9 \in A_3\} \quad (22)$$

is an extension of the alphabet A, with cardinal $$\text{Card}(\tilde{A}) = \left(\frac{M}{3}\right)^9,$$

since $$\text{Card}(A_1) = \text{Card}(A_2) = \text{Card}(A_2) = \frac{M}{3}.$$

For example for a 6-PPM alphabet, the alphabet $\tilde{A}$ will be composed of nonuplets $\sigma_1, \sigma_2, \sigma_3, \sigma_4, \sigma_5, \sigma_6, \sigma_7, \sigma_8, \sigma_9$, such that:

$$\sigma_1, \sigma_4, \sigma_7 \in \left\{\begin{pmatrix}1\\0\\0\\0\\0\\0\end{pmatrix}, \begin{pmatrix}0\\1\\0\\0\\0\\0\end{pmatrix}\right\}; \sigma_2, \sigma_5, \sigma_8 \in \left\{\begin{pmatrix}0\\0\\1\\0\\0\\0\end{pmatrix}, \begin{pmatrix}0\\0\\0\\1\\0\\0\end{pmatrix}\right\}; \quad (23)$$

$$\sigma_3, \sigma_6, \sigma_9 \in \left\{\begin{pmatrix}0\\0\\0\\0\\1\\0\end{pmatrix}, \begin{pmatrix}0\\0\\0\\0\\0\\1\end{pmatrix}\right\};$$

In the general case of an M-PPM alphabet, where M is a multiple of 3, the space-time code used by the MIMO-UWB system with three antennas is defined by the following matrix with size 3M×3:

$$C = \quad (24)$$
$$\begin{pmatrix} \sigma_1 + \sigma_2 + \sigma_3 & \sigma_4 + \sigma_5 + \sigma_6 & \sigma_7 + \sigma_8 + \sigma_9 \\ \Delta(\sigma_7 + \Omega^{(1)}\sigma_8 + \sigma_9) & \sigma_1 + \Omega^{(1)}\sigma_2 + \sigma_3 & \sigma_4 + \Omega^{(1)}\sigma_5 + \sigma_6 \\ \Delta(\sigma_4 + \sigma_5 + \Omega^{(2)}\sigma_6) & \Delta(\sigma_7 + \sigma_8 + \Omega^{(2)}\sigma_9) & \sigma_1 + \sigma_2 + \Omega^{(2)}\sigma_3 \end{pmatrix}$$

where $\sigma_1, \sigma_2, \sigma_3, \sigma_4, \sigma_5, \sigma_6, \sigma_7, \sigma_7, \sigma_8, \sigma_9$ are information symbols to be transmitted represented in the form of column vectors with size M;

$\Omega^{(1)}$ is a matrix with size M×M defined by:

$$\Omega^{(1)} = \begin{pmatrix} I_{M'} & 0_{M'} & 0_{M'} \\ 0_{M'} & \Omega' & 0_{M'} \\ 0_{M'} & 0_{M'} & I_{M'} \end{pmatrix} \quad (25)$$

where $$M' = \frac{M}{3},$$

where $I_{M'}$ is the unit matrix and $0_{M'}$ is the null matrix with size M'×M' and Ω' is a permutation matrix with size M'×M'. Note that the $\Omega^{(1)}$ matrix will only permute the modulation positions of the alphabet $A_2$;
$\Omega^{(2)}$ is a matrix with size M×M defined by:

$$\Omega^{(2)} = \begin{pmatrix} I_{M'} & 0_{M'} & 0_{M'} \\ 0_{M'} & I_{M'} & 0_{M'} \\ 0_{M'} & 0_{M'} & \Omega' \end{pmatrix} \quad (26)$$

using the same notation conventions as above. It will be noted that the $\Omega^{(2)}$ matrix only permutes the modulation positions of the alphabet $A_3$.

Δ is a permutation matrix with size M×M operating on modulation positions of the alphabet A.

The matrices Δ and Ω' may be circular permutation matrices or even simple circular shift matrices as above. Obviously, the space-time code is also defined within one permutation of the rows and columns of C.

The binary rate of the space-time code defined by expression (24) is:

$$R = \frac{\log_2\left(\left(\frac{M}{3}\right)^9\right)}{3} = 3\log_2\left(\frac{M}{3}\right) \quad (27)$$

The space-time code is also maximum diversity and has beneficial properties already mentioned for the first embodiment.

Figure 4:
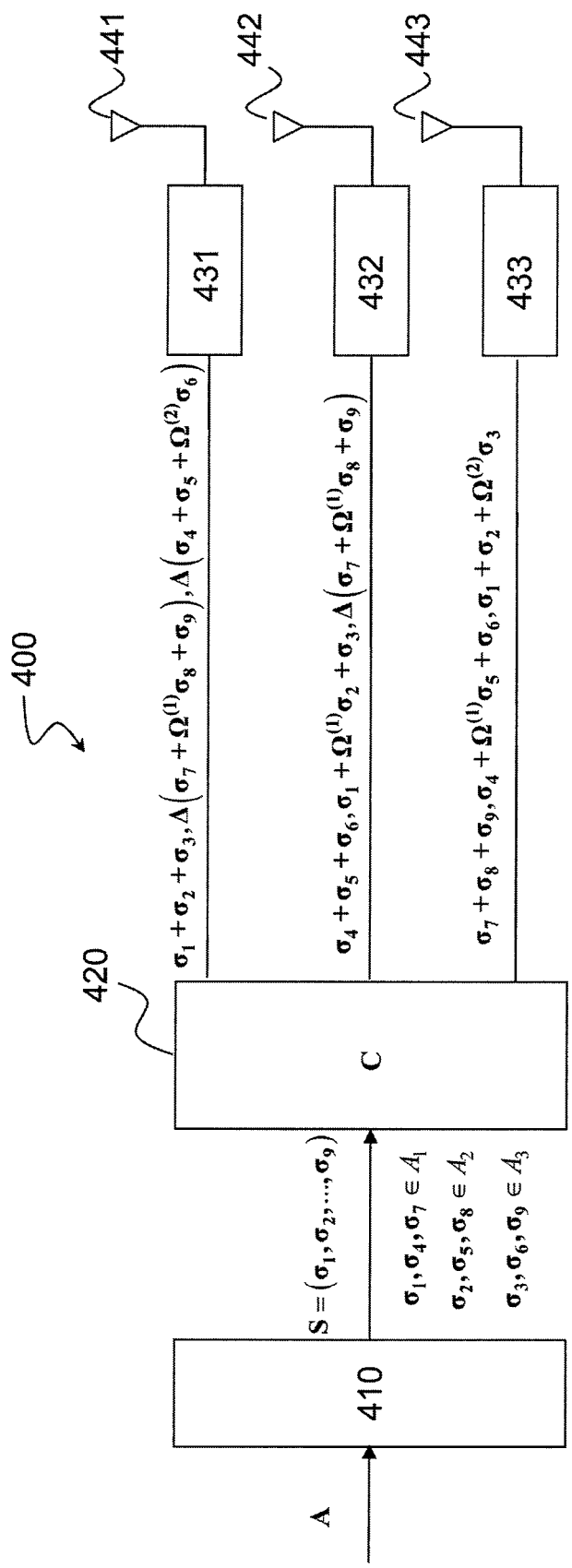
FIG. 4 diagrammatically shows a multi-antenna UWB transmission system according to a second embodiment of the invention.

FIG. 4 shows an example of a UWB transmission system with three radiative elements according to a second embodiment of the invention. The radiative element may be UWB antennas, laser diodes or infrared LEDs. The system 400 comprises a space-time encoder 420, three UWB modulators denoted by 431, 432 and 433 and three UWB antennas, 441, 442 and 443. The encoder 420 receives blocks of information symbols $S=(\sigma_1,\sigma_2,\sigma_3,\sigma_4,\sigma_5,\sigma_6,\sigma_7,\sigma_8,\sigma_9)$ belonging to the alphabet Ã and calculates elements of the matrix C satisfying the expression (24) or a variant obtained by permutation of its rows and/or its columns as described above. In the case of a space-time code defined by (24), the encoder 420 transmits the vectors $\sigma_1+\sigma_2+\sigma_3$, $\sigma_4+\sigma_5+\sigma_6$, $\sigma_7+\sigma_8+\sigma_9$ during the first channel use, vectors $\Delta(\sigma_7+\Omega^{(1)}\sigma_8+\sigma_9)$, $\sigma_1+\Omega^{(1)}\sigma_2+\sigma_3$ and $\sigma_4+\Omega^{(1)}\sigma_5+\sigma_6$ during the second channel use, and finally the vectors $\Delta(\sigma_4+\sigma_5+\Omega^{(2)}\sigma_6)$, $\Delta(\sigma_7+\sigma_8+\Omega^{(2)}\sigma_9)$ and $\sigma_1+\sigma_2+\Omega^{(2)}\sigma_3$ during the third channel use, to modulators 431, 432 and 433 respectively.

The UWB modulator 431 starts from the column vectors $\sigma_1+\sigma_2+\sigma_3$, $\Delta(\sigma_7+\Omega^{(1)}\sigma_8+\sigma_9)$ and $\Delta(\sigma_7+\Omega^{(1)}\sigma_8+\sigma_9)$ and generates the corresponding modulated pulse UWB signals and transmits them to the antenna 441 during the first, second and third channel uses respectively. Similarly, the UWB modulator 432 starts from the column vectors $\sigma_4+\sigma_5+\sigma_6$, $\sigma_1+\Omega^{(1)}\sigma_2+\sigma_3$ et $\Delta(\sigma_7+\Omega^{(1)}\sigma_8+\sigma_9)$ and generates the corresponding modulated pulse UWB signals and transmits them to the antenna 442 during the first, second and third channel uses respectively. Finally, the UWB modulator 433 starts from the column vectors $\sigma_7+\sigma_8+\sigma_9$, $\sigma_4+\Omega^{(1)}\sigma_5+\sigma_6$ and $\sigma_1+\sigma_2+\Omega^{(2)}\sigma_3$ and generates the corresponding modulated pulse UWB signals and transmits them to the antenna 443 during the first, second and third channel uses respectively.

Like the first embodiment, the system 400 may comprise a transcoder 410 adapted to receive information symbols, for example binary symbols $A=(a_1,a_2,\ldots,a_b)$ and to code them in the form of S ∈ Ã blocks.

More generally, the first and second embodiments may be generalised to the case of a MIMO-UWB system with P radiative elements for a number of modulation positions M that is a multiple P. We set $$M' = \frac{M}{P}.$$

The alphabet A may be partitioned into P separate consecutive ranges or sub-alphabets, namely $A_1=\{1,\ldots,M'\}$, $A_2=\{M'+1,\ldots,2M'\},\ldots,A_P=\{M-M'+1,\ldots,M\}$.

We will consider that blocks of information symbols $S=(\sigma_1,\sigma_2,\ldots,\sigma_{P^2})$ in which $\sigma_1,\sigma_2,\ldots,\sigma_{P^2}$ are symbols of A such that $\sigma_{qP+1} \in A_1$, $\sigma_{qP+2} \in A_2, \ldots, \sigma_{qP+P} \in A_P$ where $q=0,\ldots,P-1$. The alphabet Ã composed of $P^2$-uplets satisfying the previous condition, in other words:

$$\tilde{A}=\{(\sigma_1,\sigma_2,\ldots,\sigma_{P^2})|\sigma_{qP+1} \in A_1; \sigma_{qP+2}, \in A_2;\ldots,\sigma_{(q+1)P} \in A_P; q=0,\ldots,P-1\} \quad (28)$$

is an extension of the alphabet A, with cardinal Card(Ã)= $(M')^{P^2}$, because Card($A_p$)=M'.

The space-time code used by the MIMO-UWB system with P antennas is defined by the matrix C with size PM×P given in the appendix.

The $\Omega^{(p)}$, p=1,...,P−1 matrices are size M×M matrices defined by:

$$\Omega^{(1)} = \begin{pmatrix} I_{M'} & 0_{M'} & \ldots & 0_{M'} \\ 0_{M'} & \Omega' & \ldots & 0_{M'} \\ \vdots & \vdots & \ddots & \vdots \\ 0_{M'} & 0_{M'} & \ldots & I_{M'} \end{pmatrix} \quad (29)$$

and so on, the Ω' matrix occupying successive positions on the diagonal until:

$$\Omega^{(P-1)} = \begin{pmatrix} I_{M'} & 0_{M'} & \ldots & 0_{M'} \\ 0_{M'} & I_{M'} & \ldots & 0_{M'} \\ \vdots & \vdots & \ddots & \vdots \\ 0_{M'} & 0_{M'} & \ldots & \Omega' \end{pmatrix} \quad (30)$$

where $I_{M'}$ is the unit matrix and $0_{M'}$ is the null matrix with size M'×M', and Ω' is a permutation matrix with size M'×M'. It will be noted that matrix $\Omega^{(p)}$, p=1,...,P−1, only permutes the modulation positions of the alphabet $A_{p+1}$.

Δ is a permutation matrix with size M×M operating on the modulation positions of the alphabet A.

The space-time code is once again defined within one permutation of the rows and columns of C.

In general, the conclusions described for the first embodiment (P=2) and the second embodiment (P=3) are also valid for P>3. In particular, the binary rate of the system is:

$$R = \frac{\log_2((M')^{P^2})}{P} = P\log_2\left(\frac{M}{P}\right) \quad (31)$$

which is greater than the rate of a conventional single antenna system $\log_2(M)$. The space-time code also has maximum diversity properties, with unsigned nature and power balance between antennas.

The UWB signals transmitted by the system illustrated in FIGS. 3, 4 or more generally by a MIMO-UWB system with P antennas using the space-time encoder described above may be processed in a conventional manner by a multi-antenna receiver. For example, the receiver can include a Rake type correlation stage followed by a decision stage, for example using a sphere decoder known those skilled in the art.

Appendix:

$$C = \begin{pmatrix} \sigma_1 + \sigma_2 + \ldots + \sigma_P & \sigma_{P+1} + \sigma_{P+2} + \ldots + \sigma_{2P} & \ldots & \sigma_{P(P-1)+1} + \sigma_{P(P-1)+2} + \ldots + \sigma_{P^2} \\ \Delta(\sigma_{P(P-1)+1} + \Omega^{(1)}\sigma_{P(P-1)+2} + \ldots + \sigma_{P^2}) & \sigma_1 + \Omega^{(1)}\sigma_2 + \ldots + \sigma_P & \ldots & \sigma_{P(P-2)+1} + \sigma_{P(P-2)+2} + \ldots + \sigma_{P(P-1)} \\ \vdots & \vdots & \ddots & \vdots \\ \Delta(\sigma_{P(P-2)+1} + \sigma_{P(P-2)+2} + \ldots + \Omega^{(P)}\sigma_{P(P-1)}) & \Delta(\sigma_{P(P-1)+1} + \sigma_{P(P-1)+2} + \ldots + \Omega^{(P)}\sigma_{P^2}) & \ldots & \sigma_1 + \sigma_2 + \ldots + \Omega^{(P)}\sigma_P \end{pmatrix}$$

The invention claimed is:

1. Space-time coding method for a UWB transmission system comprising two radiative elements, said method comprising coding a block of information symbols S=($\sigma_1,\sigma_2,\sigma_3,\sigma_4$) belonging to a PPM modulation alphabet with an even number M of modulation positions, said alphabet being partitioned into first and second sub-alphabets corresponding to successive ranges of modulation positions, the symbols $\sigma_1,\sigma_3$ belonging to the first sub-alphabet and the symbols $\sigma_2,\sigma_4$ belonging to the second sub-alphabet, and coding said symbol block into a sequence of vectors, each vector being associated with a given use of the transmission channel and a given radiative element, the components of a vector being intended to modulate the position of a pulse UWB signal, each component corresponding to a PPM modulation position, wherein said vectors are obtained from elements of the matrix:

$$C = \begin{pmatrix} \sigma_1 + \sigma_2 & \sigma_3 + \sigma_4 \\ \Delta(\sigma_3 + \Omega\sigma_4) & \sigma_1 + \Omega\sigma_2 \end{pmatrix}$$

one line of the matrix corresponding to one use of the transmission channel and one column of the matrix corresponding to one radiative element, the matrix C being defined within one permutation of its rows and/or its columns, $\Delta$ being a permutation of the PPM positions of said alphabet and $\Omega$ being a permutation of the PPM modulation positions of said second sub-alphabet.

2. Space-time coding method according to claim 1, characterised in that $\Omega$ is a circular permutation of PPM modulation positions of said second sub-alphabet.

3. Space-time coding method according to claim 2, characterised in that $\Omega$ is a circular shift of PPM modulation positions of said second alphabet.

4. Space-time coding method for a UWB transmission system comprising three radiative elements, said method comprising coding a block of information symbols S=($\sigma_1,\sigma_2,\sigma_3,\sigma_4,\sigma_5,\sigma_6,\sigma_7,\sigma_8,\sigma_9$) belonging to a PPM modulation alphabet with a number M of modulation positions that is a multiple of 3, said alphabet being partitioned into first, second and third sub-alphabets corresponding to successive ranges of modulation positions, the $\sigma_1,\sigma_4,\sigma_7$ symbols belonging to the first sub-alphabet, the $\sigma_2,\sigma_5,\sigma_8$ symbols belonging to the second sub-alphabet and the $\sigma_3,\sigma_6,\sigma_9$ symbols belonging to the third sub-alphabet, and coding said block of symbols into a sequence of vectors, each vector being associated with a given use of the transmission channel and a given radiative element, components of a vector being designed to modulate the position of a pulse UWB signal, each component corresponding to a PPM modulation position, wherein said vectors are obtained from elements of the matrix:

$$C = \begin{pmatrix} \sigma_1 + \sigma_2 + \sigma_3 & \sigma_4 + \sigma_5 + \sigma_6 & \sigma_7 + \sigma_8 + \sigma_9 \\ \Delta(\sigma_7 + \Omega^{(1)}\sigma_8 + \sigma_9) & \sigma_1 + \Omega^{(1)}\sigma_2 + \sigma_3 & \sigma_4 + \Omega^{(1)}\sigma_5 + \sigma_6 \\ \Delta(\sigma_4 + \sigma_5 + \Omega^{(2)}\sigma_6) & \Delta(\sigma_7 + \sigma_8 + \Omega^{(2)}\sigma_9) & \sigma_1 + \sigma_2 + \Omega^{(2)}\sigma_3 \end{pmatrix}$$

one row of the matrix corresponding to one use of the transmission channel and one column of the matrix corresponding to one radiative element, the matrix C being defined within one permutation of its rows and/or its columns, $\Delta$ being a permutation of the PPM positions of said alphabet, $\Omega^{(1)}$ being a permutation of the PPM modulation positions of said second sub-alphabet and $\Omega^{(2)}$ being a permutation of the PPM modulation positions of said third sub-alphabet.

5. Space-time coding method according to claim 4, characterised in that $\Omega^{(1)}$ and/or $\Omega^{(2)}$ is/are one or more circular permutations of the PPM modulation positions of the second and third sub-alphabets respectively.

6. Space-time coding method according to claim 5, characterised in that $\Omega^{(1)}$ and/or $\Omega^{(2)}$ is/are one or more circular shifts of the PPM modulation positions of said second and third sub-alphabets respectively.

7. Space-time coding method for a UWB transmission system comprising a plurality P of radiative elements, said method comprising coding a block of information symbols S=($\sigma_1,\sigma_2,\ldots,\sigma_{p^2}$) belonging to a PPM modulation alphabet with a number M of modulation positions that is a multiple of P, said alphabet being partitioned into P sub-alphabets corresponding to successive ranges of modulation positions, the $\sigma_{qP+1}$, q=0, ..., P-1 symbols belonging to the first sub-alphabet, the $\sigma_{qP+2}$, q=0, ..., P-1 symbols belonging to the second sub-alphabet, and so on, the $\sigma_{qP+P}$, q=0, ..., P-1 symbols belonging to the P th sub-alphabet, and coding said block of symbols into a sequence of vectors, each vector being associated with a given use of the transmission channel and a given radiative element, the components of a vector being intended to modulate the position of a pulse UWB signal, each component corresponding to a PPM modulation position, wherein said vectors are obtained from elements of the matrix given in the appendix, one row of the matrix corresponding to one use of the transmission channel and one column of the matrix corresponding to one radiative element, the matrix C being defined within one permutation of its rows and/or its columns, $\Delta$ being a permutation of the PPM positions of said alphabet, the matrices $\Omega^{(p)}$, p=1, . . . ,P−1 being a permutation of the PPM modulation positions of the (p+1) th sub-alphabet.

8. Space-time coding method according to claim 7, characterised in that at least one matrix $\Omega^{(p)}$, p=1, . . . ,P−1 is a circular permutation of the PPM modulation positions of the (p+1) th sub-alphabet.

9. Space-time coding method according to claim 8, characterised in that at least one matrix $\Omega^{(p)}$, p=1, . . . ,P−1 is a circular shift of the PPM modulation positions of the (p+1)th sub-alphabet.

10. Space-time coding method according to any one of claims 1, 5, and 7, characterised in that the matrix $\Delta$ is a circular permutation of said alphabet.

11. Space-time coding method according to claim 10, characterised in that the matrix $\Delta$ is a circular shift of said alphabet.

12. Space-time coding method according to any one of claims 1, 5 and 7, characterised in that the radiative elements are UWB antennas.

13. Space-time coding method according to any one of claims 1, 5, and 7, characterised in that the radiative elements are laser diodes or light emitting diodes.

14. Space-time coding method according to any one of claims 1, 5, and 7, characterised in that said pulse signal may be a TH-UWB signal.

* * * * *

UNITED STATES PATENT AND TRADEMARK OFFICE
CERTIFICATE OF CORRECTION

PATENT NO.        : 8,279,973 B2
APPLICATION NO.   : 12/256874
DATED             : October 2, 2012
INVENTOR(S)       : Chadi Abou Rjeily It is certified that error appears in the above-identified patent and that said Letters Patent is hereby corrected as shown below:

Column 8 line 67, please delete "M'''1" and insert therefor --M'-1--

Column 12 line 3, please delete "94"

Signed and Sealed this
Twelfth Day of February, 2013

Teresa Stanek Rea
*Acting Director of the United States Patent and Trademark Office*